(12) United States Patent
Moncrieff et al.

(10) Patent No.: US 6,702,659 B1
(45) Date of Patent: Mar. 9, 2004

(54) PROFILING DEVICE

(76) Inventors: Lois Moncrieff, 126 Springfield Avenue, Coolum Qld (AU), 4573; William Moncrieff, 126 Springfield Avenue, Coolum Qld (AU), 4573

( * ) Notice: Subject to any disclaimer, the term of this patent is extended or adjusted under 35 U.S.C. 154(b) by 0 days.

(21) Appl. No.: 09/913,910
(22) PCT Filed: Feb. 19, 1999
(86) PCT No.: PCT/AU00/00109
§ 371 (c)(1),
(2), (4) Date: Jan. 23, 2002
(87) PCT Pub. No.: WO00/48799
PCT Pub. Date: Aug. 24, 2000

(30) Foreign Application Priority Data

Feb. 19, 1999 (AU) .............................................. PP 8790

(51) Int. Cl.⁷ ............................................... B24B 23/00
(52) U.S. Cl. ...................... 451/358; 451/241; 451/359; 451/438; 451/439; 125/13.01
(58) Field of Search ................................ 451/358, 359, 451/241, 438, 439, 545, 549; 125/13.01

(56) References Cited

U.S. PATENT DOCUMENTS

| | | | | |
|---|---|---|---|---|
| 1,756,710 A | * | 4/1930 | Tuttle | 451/241 |
| 2,681,531 A | * | 6/1954 | Mastrone | 451/241 |
| 4,033,319 A | * | 7/1977 | Winter | 125/13.01 |
| 4,182,589 A | * | 1/1980 | Boudreault et al. | 409/138 |
| 5,449,317 A | * | 9/1995 | Takessian | 451/558 |
| 5,522,684 A | * | 6/1996 | Heck | 409/138 |
| 6,280,309 B1 | * | 8/2001 | Van Osenbruggen | 451/415 |
| 6,427,677 B1 | * | 8/2002 | O'Banion et al. | 125/23.02 |
| 6,450,741 B1 | * | 9/2002 | Cannelli, Jr. | 409/138 |
| 6,508,244 B2 | * | 1/2003 | Lee | 125/12 |

* cited by examiner

*Primary Examiner*—Joseph J. Hail, III
*Assistant Examiner*—Alvin J Grant
(74) *Attorney, Agent, or Firm*—Olive & Olive, P.A.

(57) ABSTRACT

A device is provided to assist in the cutting, mitrering, chamfering, and similar operations of ceramic and other tiles. The device can be readily attached to, and subsequently removed from, a cutting implement, such as an angle grinder or a circular saw or jig saw. The device includes an elongate L-shaped member (1). Approximately mid-length of the member (1), there is a slot (2). A first shaped, rigid arm (3) is fixed at one of its ends (4) to one end (5) of the elongate member (1) by rivets (6). Near the other end (7) of the arm (3), there is a hole (8). A second shaped, rigid arm (9) is fixed at one of its ends (10) to the other end (11) of the elongate member (1) by rivets (12). Near the other end (13) of the arm (9) there is a hole (14). The device is affixed to a hand-held angle grinder (15) by the arms (3) and (9), the arm (3) being attached to one side of the casing of the angle grinder (15) by a casing bolt (16) passing through the hole (8), and the arm (9) being attached to the other side of the casing of the angle grinder (15) by a casing bolt (17) passing through the hole (14). The blade (18) of the angle grinder (15) passes through the slot (2) in the elongate member (1).

7 Claims, 2 Drawing Sheets

PROFILING DEVICE

THIS INVENTION relates to a device to assist in the cutting, mitrering, chamfering and similar operations on glass, tiles and like items. In particular, it is directed to a device which may be independently powered or which can be readily attached, and subsequently removed from, a cutting implement such as an angle grinder or a circular- or jig-saw.

When tiling floor or wall areas, rarely are the surfaces to be covered an exact multiple of the length of the individual tiles used; some cutting of the tiles is almost always required. Further, when tiles meet at corners, it is, necessary to mitre the edges of the adjacent tiles to ensure that only the finished, often glazed outer surface is visible.

Prior art technology to perform these cuts or mitre joints necessitates the use of a bench cutter or grinder. They usually include some form of purpose-built cutting implement supported on a table or stand. Integral with the table or stand is a guiding mechanism to guide the tile relative to the cutting implement to achieve the cut at the required location and angle. Such devices are relatively large and thus weighty, cumbersome and expensive. Also, they usually have to be dismantled for transport and then reassembled on site before use. In addition, for tiler tradesman, the only use for such a device is indeed for the cutting, mitrering, chamfering, etc. of tiles.

There thus remains a need for a device which can at least perform the cutting tasks necessary for a tiler tradesman, but not require the inconvenience of a bench mounted device.

Although specific reference has been made with respect to the need for a device to cut, mitre or chamfer a tile, it will be recognized that this is not limiting and that the present invention will find use in other areas.

It is therefore a general object of the present invention to overcome, or at least ameliorate, one or more of the above problems and to provide a device to assist in the cutting, mitrering, chamfering and similar operations on glass, tiles and like items.

According to the present invention, there is provided a device for attachment to a cutting implement, said cutting implement being adapted to cut, mitre, chamfer or perform a similar operation on an item at a required angle, said device including:

a positioning means for placing said device in a required position;
  a slot in said positioning means through which a cutting blade of said cutting implement can protrude to enable said blade to cut, mitre, chamfer or perform a similar operation on said item; and
  an attachment means fixed to said positioning means to enable attachment of said device to said cutting implement.

Preferably, said device is removably attached to said cutting implement.

Preferably, said cutting implement is selected from the group comprising an angle grinder, circular or jig-saw or similar implement.

More preferably, said cutting implement is an angle grinder.

Most preferably, said angle grinder is a hand-held angle grinder

Preferably, said positioning means is an elongate member of L-shaped cross-section, one arm of which can rest on an upper surface of said item to be cut, mitred, chamfered or have a similar operation performed thereon, the other arm providing the required guide for said item relative to the cutting implement to achieve the cut at the required location.

Preferably, said attachment means is a pair of rigid straps, wherein one end of each of said straps is fixed to said positioning means, and wherein the other end of one of said straps is fixed to one side of said cutting implement and the corresponding other end of the second strap is fixed to the other side of said cutting implement.

More preferably, said other end of one of said straps is removably fixed to said one side of said cutting implement and said corresponding other end of said second strap is removably fixed to the other side of said cutting implement.

Preferably, said item to be cut is a tile.

More preferably, said item to be cut is a ceramic tile.

The invention will now be described with reference to a preferred embodiment which is shown in the accompanying drawings wherein.

Figure 1:
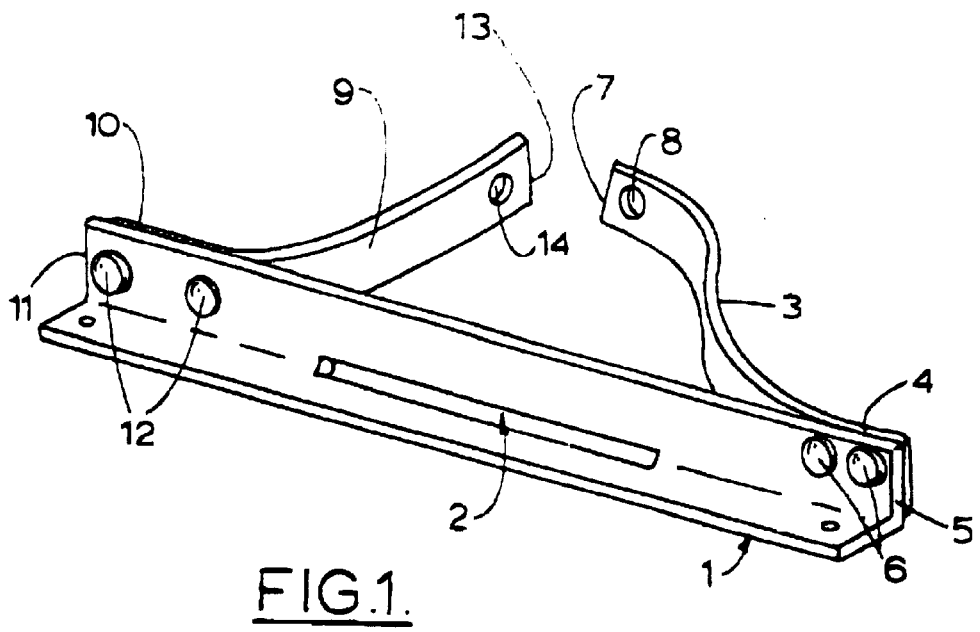
FIG. 1 is a perspective sketch of a device constructed in accordance with the present invention.

Referring to FIG. 1, the device of the invention includes an elongate L-shaped member (1). Approximately mid-length of the member (1), there is a slot (2). A first shaped rigid arm (3) is fixed at one of its ends (4) to one end (5) of the elongate member (1). The arm (3) can be affixed by any means suitable known in the art; in FIG. (1), rivets (6) are used. Near the other end (7) of the arm (3) there is a hole (8). A second shaped rigid arm (9) is fixed at one of its ends (10) to the other end (11) of the elongate member (1). Once again, the arm (9) can be affixed by any means suitable known in the art; in FIG. (1), rivets (12) are again used. Near the other end (13) of the arm (9) there is a hole (14).

Figure 2:
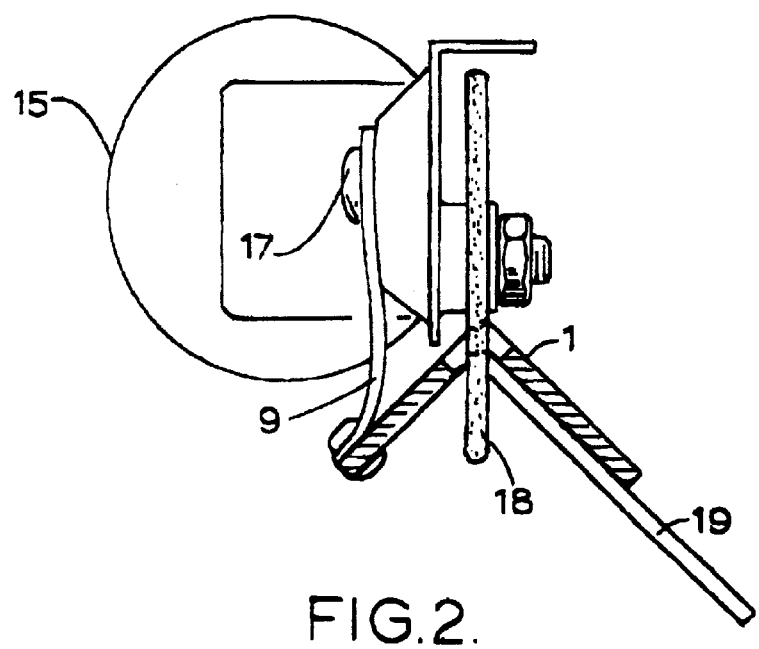
FIG. 2 is a front plan view of the device of FIG. 1 attached to an angle grinder.
Figure 3:
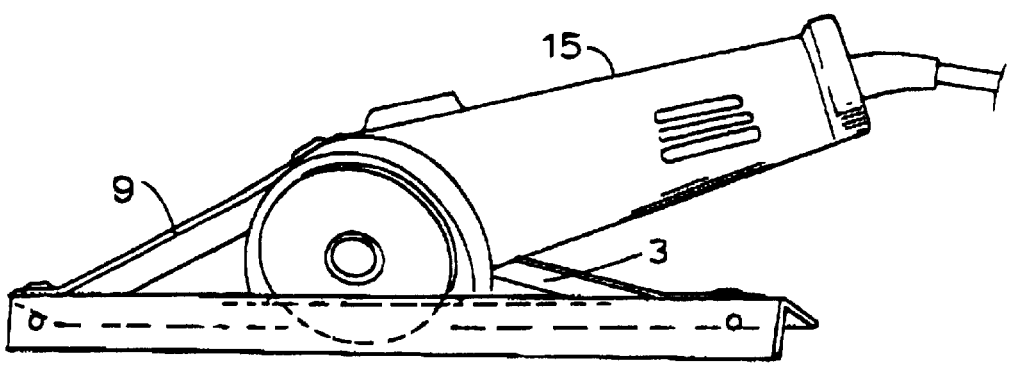
FIG. 3 is a top perspective view of the device of FIG. 1 attached to an angle grinder.
Figure 4:
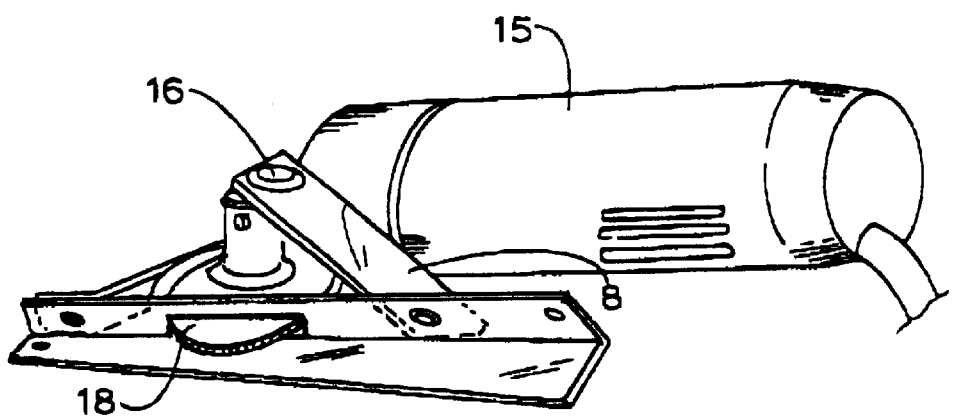
FIG. 4 is a bottom perspective view of the device of FIG. 1 attached to an angle grinder.

As illustrated in FIGS. 2 to 4, the device is affixed to a hand held angle grinder (15) by the arms (3) and (9), the arm (3) being attached to one side of the casing of the angle grinder (15) by a casing bolt (16) passing through the hole (8), and that arm (9) being attached to the other side of the casing of the angle grinder (15) by a casing bolt (17) passing through the hole (14). The blade (18) of the angle grinder (15) passes through the slot (2) in the elongate member (1) such that, in use, as depicted in FIG. 2, the blade chamfers the edge of a ceramic tile (19). When not required, the device can readily be removed from the angle grinder enabling the grinder to be used for other purposes.

It will be appreciated that the above described embodiments are only exemplification of the various aspects of the present invention and that modifications and alterations can be made thereto.

For example, specific reference has been to the use of present invention to cut or chamfer ceramic tiles usually found in the floor and wall areas of homes. Of course, the present invention could be used, for example, to cut other tiles, such as paving tiles, which could be manufactured from slate or other non-ceramic material.

Yet again, the present invention could be used to cut or bevel glass or mirrors.

Further, specific reference has been made to attach the device of the present invention to an angle grinder or other existing cutting implement. It will be recognized that the cutting implement could be manufactured specifically for the device, the cutting implement incorporating an energy source powering a cutting blade. The blade could be interchangeable with other such blades, each blade tailored for a specific cutting purpose.

These and other modifications and alterations can be made to the present invention without departing from the inventive concept as defined in the following claims.

What is claimed is:

1. A device adapted for removable attachment to a hand-held cutting implement, such as an angle grinder, circular saw, jig saw, or similar implement, to enable said cutting implement to cut, mitre, chamfer, or perform a similar operation on an item at a required angle, said device including:
   a) a positioning means for placing said device in a required position for said cut, mitre, chamfer, or similar operation to be undertaken, said positioning means having an elongate member of L-shaped cross-section, one arm of which can rest on an upper surface of said item to be cut, mitred, chamfered, or have a similar operation performed thereon, the other arm providing the required guide for said item relative to said cutting implement to achieve said cut, mitre, chamfer, or similar operation at said required position;
   b) a slot in said positioning means, through which a cutting blade of said cutting implement can protrude to enable said blade to cut, mitre, chamfer, or perform a similar operation on said item; and
   c) an attachment means fixed to said positioning means to enable attachment of said device to said cutting implement.

2. A device, as defined in claim 1, wherein said attachment means is a pair of rigid straps, wherein one end of each of said straps is fixed to said positioning means, and wherein the other end of one of said straps is fixed to one side of said cutting implement and the corresponding other end of the second strap is fixed to the other side of said cutting implement.

3. A device, as defined in claim 2, wherein said other end of one of said straps is removably fixed to said one side of said cutting implement and said corresponding other end of said second strap is removably fixed to the other side of said cutting implement.

4. A device, as defined in claim 1, wherein said item to be cut is a tile.

5. A device, as defined in claim 4, wherein said tile is a ceramic tile.

6. A device, as defined in claim 1, wherein said cutting implement is selected from the group comprising an angle grinder, circular saw, and jig saw.

7. A device, as defined in claim 6, wherein said cutting implement is an angle grinder.

* * * * *